| | | |
|---|---|---|
| (12) | United States Patent | (10) Patent No.: US 10,741,054 B1 |
| | Osman et al. | (45) Date of Patent: Aug. 11, 2020 |

(54) METHOD AND APPARATUS FOR DETERMINING A MESSAGE PREFIX

(71) Applicant: MOTOROLA SOLUTIONS, INC., Chicago, IL (US)

(72) Inventors: Mohamad Adib Osman, Sungai Petani (MY); Kamalesan Subramaniam, Sungai Petani (MY); Shahrul Fadzly Abu Seman, Butterworth (MY); Syed Isa Syed Idrus, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/504,487

(22) Filed: Jul. 8, 2019

(51) Int. Cl.
  *G06F 15/16* (2006.01)
  *G08B 25/00* (2006.01)
  *G08B 27/00* (2006.01)
  *H04W 4/90* (2018.01)

(52) U.S. Cl.
  CPC ......... *G08B 25/003* (2013.01); *G08B 25/006* (2013.01); *G08B 27/001* (2013.01); *H04W 4/90* (2018.02)

(58) Field of Classification Search
  CPC .. G08B 25/003; G08B 27/001; G08B 25/006; G08B 25/016; H04W 4/90; H04W 4/22; H04W 76/007; H04W 4/029; H04W 4/12
  See application file for complete search history.

(56) References Cited

U.S. PATENT DOCUMENTS

| | | | | |
|---|---|---|---|---|
| 5,258,751 | A * | 11/1993 | DeLuca | G08B 5/227 340/7.52 |
| 7,091,852 | B2 * | 8/2006 | Mason | G01C 21/206 340/539.13 |
| 7,245,216 | B2 * | 7/2007 | Burkley | H04W 4/024 340/539.13 |
| 7,885,291 | B2 * | 2/2011 | Delaney | H04W 92/02 370/466 |
| 8,009,035 | B1 * | 8/2011 | Vallaire | G08B 27/008 340/539.1 |
| 8,314,683 | B2 * | 11/2012 | Pfeffer | G08B 25/006 340/7.3 |
| 8,392,390 | B2 | 3/2013 | Bennett et al. | |
| 8,626,112 | B2 * | 1/2014 | Ray | G10L 13/043 455/404.1 |
| 8,866,606 | B1 * | 10/2014 | Will | G08B 25/005 340/539.11 |
| 9,014,656 | B2 * | 4/2015 | Courtney | G08B 21/10 455/404.1 |
| 9,317,155 | B2 * | 4/2016 | Magi | G06F 1/1652 |
| 9,508,248 | B2 * | 11/2016 | Nakfour | H04W 76/50 |
| 9,699,298 | B2 | 7/2017 | Rubinstein et al. | |
| 9,742,709 | B1 * | 8/2017 | Laich | H04L 51/046 |
| 10,045,187 | B1 * | 8/2018 | Soleimani | H04W 4/023 |
| 10,580,280 | B1 * | 3/2020 | Picco | G08B 25/006 |
| 10,638,298 | B1 * | 4/2020 | Di Domenico | G06N 20/00 |

(Continued)

*Primary Examiner* — An T Nguyen

(57) ABSTRACT

A method and apparatus for generating a message, or message prefix, is provided herein. During operation a message generator will have knowledge of a status of devices connected to form a personal-area network (PAN) and/or have knowledge of a current incident type assigned to a user. The message generator will then provide messages to the user based on the status of associated PAN devices and/or the incident type.

11 Claims, 7 Drawing Sheets

(56) References Cited

U.S. PATENT DOCUMENTS

| | | | |
|---|---|---|---|
| 2006/0073816 A1* | 4/2006 | Kim | H04M 1/72563 455/414.1 |
| 2010/0003952 A1* | 1/2010 | Ray | G10L 13/00 455/404.1 |
| 2010/0145702 A1 | 6/2010 | Karmarkar | |
| 2010/0232581 A1* | 9/2010 | Conahan | H04M 3/4872 379/88.09 |
| 2010/0297981 A1* | 11/2010 | Ballantyne | H04M 1/72536 455/404.2 |
| 2013/0036175 A1* | 2/2013 | Lau | H04H 60/51 709/206 |
| 2013/0157610 A1* | 6/2013 | Vainik | H04W 4/90 455/404.1 |
| 2013/0297364 A1* | 11/2013 | Putra | G06Q 10/06316 705/7.14 |
| 2014/0134969 A1* | 5/2014 | Jin | H04W 4/90 455/404.1 |
| 2014/0159891 A1 | 6/2014 | Frohlick et al. | |
| 2014/0167954 A1* | 6/2014 | Johnson | H04W 4/029 340/539.11 |
| 2014/0365570 A1 | 12/2014 | Peters | |
| 2015/0031324 A1* | 1/2015 | Zentner | H04W 76/50 455/404.2 |
| 2015/0072658 A1* | 3/2015 | Panttaja | H04W 4/12 455/412.2 |
| 2015/0187203 A1* | 7/2015 | Mohler | G08B 27/005 340/539.13 |
| 2015/0189056 A1* | 7/2015 | Magi | G06F 1/163 455/566 |
| 2016/0042767 A1* | 2/2016 | Araya | H04N 7/188 386/201 |
| 2016/0065658 A1* | 3/2016 | Alon | G06Q 10/06311 709/204 |
| 2016/0344581 A9 | 11/2016 | Karmarkar | |
| 2017/0301345 A1* | 10/2017 | Israelsson | G08G 1/096791 |
| 2018/0055456 A1* | 3/2018 | Lorden | G16H 80/00 |
| 2018/0199179 A1* | 7/2018 | Rauner | H04W 4/90 |
| 2018/0330612 A1* | 11/2018 | Lin | G06Q 50/26 |
| 2018/0375986 A1* | 12/2018 | Blanco | H04M 1/7255 |
| 2019/0066496 A1* | 2/2019 | Choi | G08G 1/162 |
| 2019/0095069 A1* | 3/2019 | Proctor | G08G 1/0175 |
| 2019/0179601 A1* | 6/2019 | Steinberg | G06Q 10/10 |
| 2019/0188328 A1* | 6/2019 | Oyenan | G06F 3/167 |
| 2019/0349476 A1* | 11/2019 | Suri | H04M 3/42102 |
| 2020/0034001 A1* | 1/2020 | Frommelt | G06F 3/0482 |
| 2020/0059776 A1* | 2/2020 | Martin | G06F 3/04817 |

* cited by examiner

METHOD AND APPARATUS FOR DETERMINING A MESSAGE PREFIX

BACKGROUND OF THE INVENTION

Tablets, laptops, phones (e.g., cellular or satellite), mobile (vehicular) or portable (personal) two-way radios, and other communication devices are now in common use by users, such as first responders (including firemen, police officers, and paramedics, among others), and provide such users and others with an ability to text and instant message other first responders.

Many texting or instant-message applications allow automatically-generated messages based upon a currently-detected situation or context of conversation for message reply. For example, many texting applications will automatically generate and send a message, "I'm currently driving right now, and cannot read your message" when it is detected that a user is driving. Another example is when a user receives message such as, "Can we meet at 5 pm later?". When such a message is received, an automatically generated message may be constructed to formulate a reply such as "I am Not Free", "OK, that's fine" or "Sure, good to me". A user may choose a reply among the presented messages. It would be beneficial if such automatically-generated messages could be better tailored to an Officer's current situation.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for generating a message, or message prefix, is provided herein. During operation a message generator will have knowledge of a status of devices connected to form a personal-area network (PAN) and/or have knowledge of a current incident type assigned to a user. The message generator will then present messages to the user based on the status of associated PAN devices and/or the incident type. The messages presented to the user may be selected and sent to other users as a text and/or instant message.

Expanding on the above, a message generator will provide a plurality of presented messages based on the fact that a public-safety event has occurred. As discussed, the public-safety event may comprise a current incident assigned to a user, or a status of at least one device connected to form a PAN.

Figure 1:
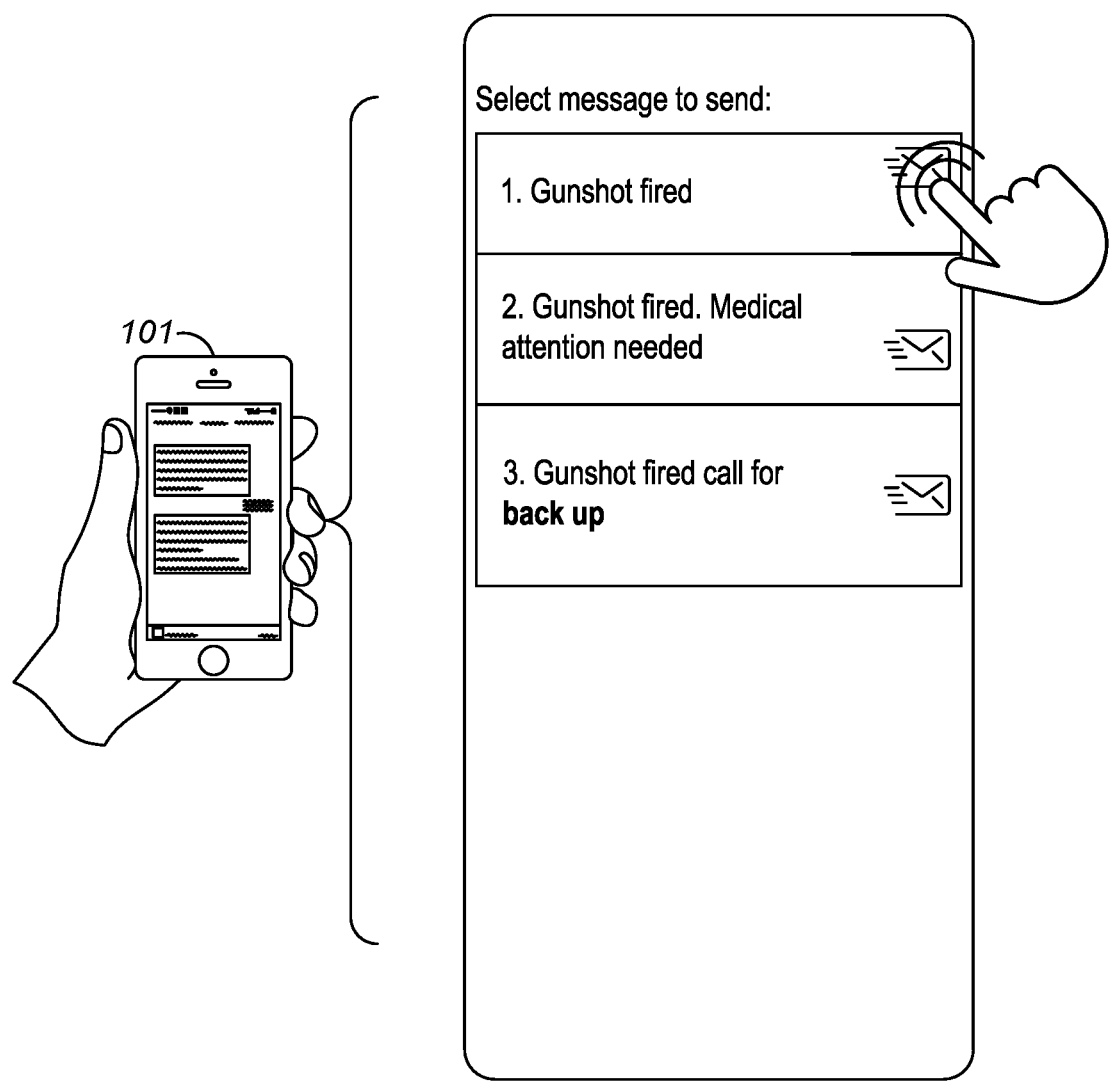
FIG. 1 illustrates auto-generation of message prefixes.

FIG. 1 illustrates an example of the above. Consider a situation where an officer is assigned to investigate potential shots fired. After assignment, the officer opens their messaging application on device 101. As is evident, prepared messages are presented/displayed for the officer. The messages are related to the officer's assignment. When one of the presented messages is selected by the officer, the selected message may be automatically sent to others, or alternatively, the selected message may be added to or modified by the officer prior to sending.

If the user selects a particular message (first message) another multiple messages (second messages) may be presented below the first message, with more details relating to the first message. More details will be provided in the second messages with the second messages based on available sensor data. In the example shown in FIG. 2, a user has selected "Gunshot fired" as the first message. The first message was auto-generated as a result of an officer being assigned to investigate shots fired. As is evident, second messages are displayed under the "Gunshot fired" message that are related to the "Gunshot fired" message. These messages may be generated based on sensor data. Selecting (e.g., by tapping) on any of the first or second messages will cause the selected message to be populated in a message field a texting or messaging application.

Figure 2:
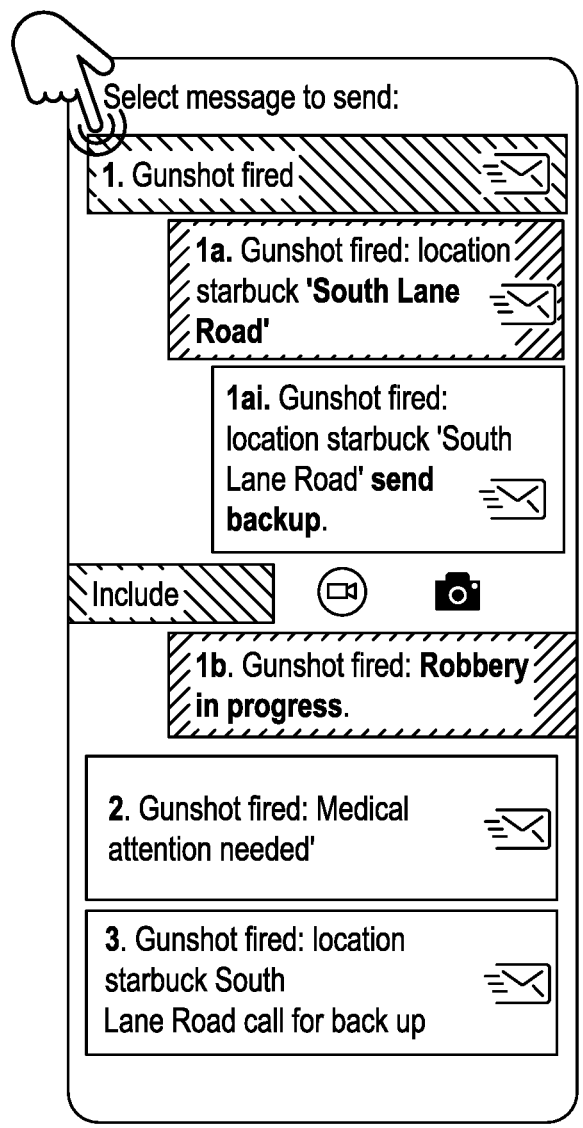
FIG. 2 illustrates auto-generation of message prefixes.

It should be noted that in FIG. 1 and FIG. 2, only the potential responses are shown for ease of explanation. In other words, the actual message generated from tapping various presented messages is not shown in FIG. 1 or FIG. 2. Selecting any of the messages shown in FIG. 1 and FIG. 2 will forward the messages to a text box within a messaging/texting application. Other information, such as recipients of the messages will need to be populated within the messaging/texting application.

It should also be noted that the messages presented to a user can be based both on an assignment and sensor data. For example, because the officer was assigned to a "shots fired" assignment, the messages presented are related to potential messages that may need to be sent when investigating shots fired. As is evident, messages having location data may also presented. This location data is taken from a sensor co-located with device 101.

Figure 3:
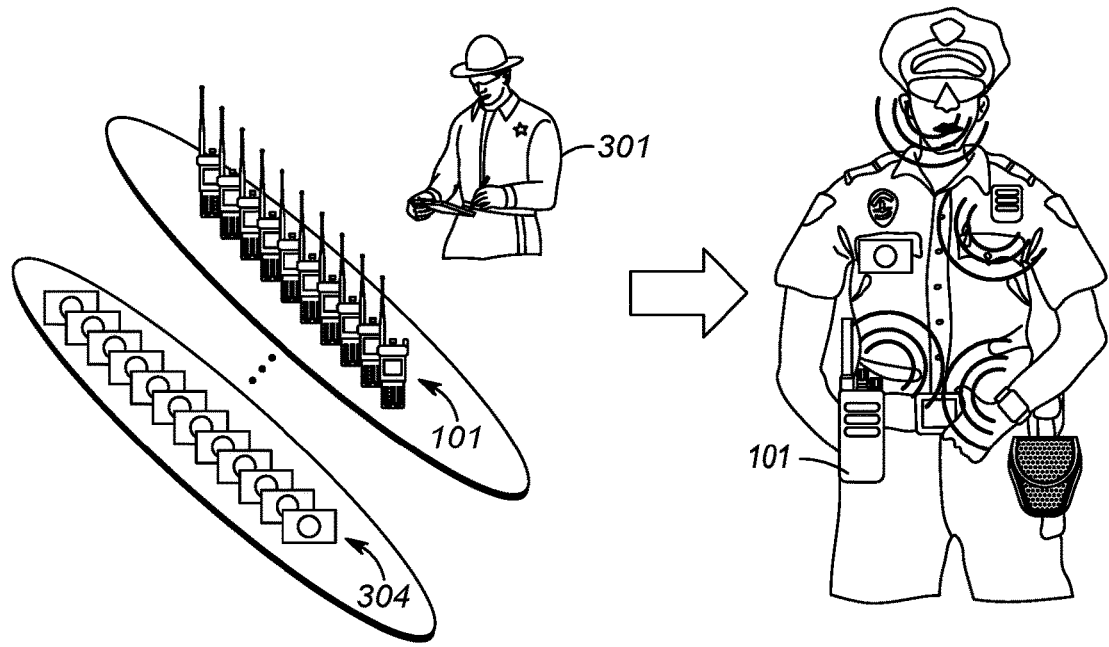
FIG. 3 illustrates an operational environment for the present invention.

FIG. 3 illustrates an operational environment for the present invention. As shown, a public safety officer 301 will be equipped with devices that determine various physical and environmental conditions surrounding the public-safety officer. These conditions are generally reported back to device 101 and ultimately to a dispatch center so an appropriate action may be taken. For example, police officers may have a sensor that determines when a gun is drawn. Upon detecting that an officer has drawn their gun, a notification may be sent back to the dispatch operator so that, for example, other officers in the area may be notified of the situation.

It is envisioned that the public-safety officer will have an array of shelved devices available to the officer at the beginning of a shift. The officer will select the devices off the shelf, and form a personal area network (PAN) with the devices that will accompany the officer on his shift. For example, the officer may pull a gun-draw sensor, a body-worn camera, a wireless microphone, a smart watch, a police radio, smart handcuffs, a man-down sensor, a bio-sensor, . . . , etc. All devices pulled by the officer will be configured to form a PAN by associating (pairing) with each other and communicating wirelessly among the devices. At least one device may be configured with a message generator as described herein. In a preferred embodiment, the PAN comprises more than two devices, so that many devices are connected via the PAN simultaneously.

A method called bonding is typically used for recognizing specific devices and thus enabling control over which devices are allowed to connect to each other when forming the PAN. Once bonded, devices then can establish a connection without user intervention. A bond is created through a process called "pairing". The pairing process is typically triggered by a specific request by the user to create a bond from a user via a user interface on the device.

As shown in FIG. 3, public-safety officer 301 has an array of devices to use during the officer's shift. For example, the officer may pull one radio 101 and one camera 304 for use during their shift. Other devices may be pulled as well. As shown in FIG. 3, officer 301 will preferably wear the devices during a shift by attaching the devices to clothing. These devices will form a PAN throughout the officer's shift.

Figure 4:
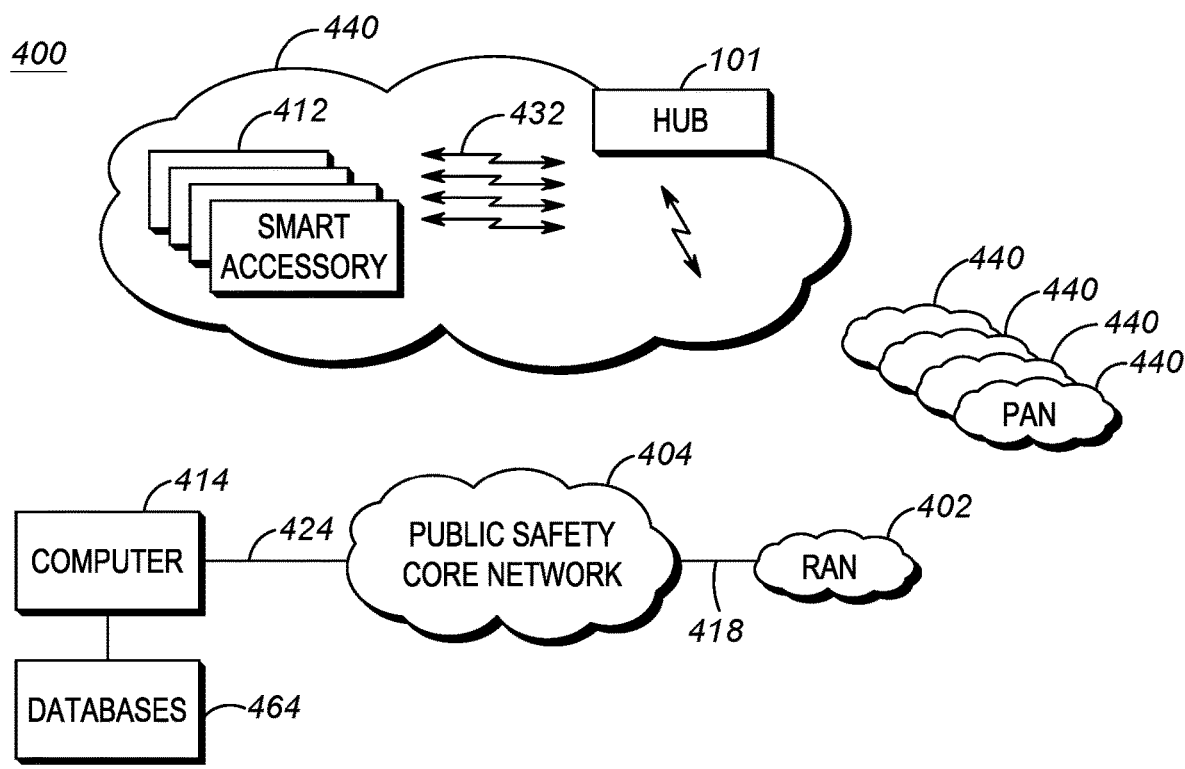
FIG. 4 depicts an example communication system that incorporates a message generator.

FIG. 4 depicts an example communication system 400 that incorporates PANs created as described above. System 400 includes one or more radio access networks (RANs) 402, a public-safety core network 404, hub (PAN master device) 101, local devices (slave devices that serve as smart accessories/sensors) 412, computer 414, and communication links 418, 424, and 432. In a preferred embodiment of the present invention, hub 101 and devices 412 form PAN 440, with communication links 432 between devices 412 and hub 101 taking place utilizing a short-range communication system protocol such as a Bluetooth communication system protocol. Each officer will have an associated PAN 440. Thus, FIG. 4 illustrates multiple PANs 440 associated with multiple officers.

RAN 402 includes typical RAN elements such as base stations, base station controllers (BSCs), routers, switches, and the like, arranged, connected, and programmed to provide wireless service to user equipment (e.g., hub 101, and the like) in a manner known to those of skill in the relevant art. RAN 402 may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, RAN 402 may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, RAN 402 may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

Public-safety core network 404 may include one or more packet-switched networks and/or one or more circuit-switched networks, and in general provides one or more public-safety agencies with any necessary computing and communication needs, transmitting any necessary public-safety-related data and communications.

For narrowband LMR wireless systems, core network 404 operates in either a conventional or trunked configuration. In either configuration, a plurality of communication devices is partitioned into separate groups (talkgroups) of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (e.g., talkgroups). Thus, all groups are served by all channels. The trunked radio system works to take advantage of the probability that not all groups need a traffic channel for communication at the same time.

Group calls may be made between wireless and/or wireline participants in accordance with either a narrowband or a broadband protocol or standard. Group members for group calls may be statically or dynamically defined. That is, in a first example, a user or administrator may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., join a group call having a particular talkgroup ID) with each of the pre-designated participants in the defined group. In another example, communication devices may dynamically affiliate with a group (and also disassociate with the group) perhaps based on user input, and the switching and/or radio network may track group membership and route new group calls according to the current group membership.

Text or instant messaging may also be sent among wireless or wired devices. More particularly, wireless and/or wireline participants can send texts or instant messages in accordance with either a narrowband or a broadband protocol or standard, or other proprietary standards. The use of other networks (not shown in FIG. 4) to transmit text or instant messages may take place. For example, the use of a public wireless/cellular infrastructure may be utilized for messaging/texting.

Hub 101 serves as a PAN master device, and may be any suitable computing and communication device configured to engage in wireless communication with the RAN 402 over the air interface as is known to those in the relevant art.

Moreover, one or more hub 101 are further configured to engage in wired and/or wireless communication with one or more local device 412 via the communication link 432. Hub 101 will be configured to determine when to forward information received from PAN devices to, for example, a dispatch center. The information can be forwarded to the dispatch center via RANs 402 based on a combination of device 412 inputs. In one embodiment, all information received from sensors 412 will be forwarded to computer 414 via RAN 402. In another embodiment, hub 101 will filter the information sent, and only send high-priority information back to computer 414. Hubs 101 will also be configured to generate messages as described herein.

It should also be noted that any one or more of the communication links 418, 424, could include one or more wireless-communication links and/or one or more wired-communication links.

Devices 412 and hub 101 may comprise any device capable of forming a PAN. For example, devices 412 may comprise a gun-draw sensor, a body temperature sensor, an accelerometer, a heart-rate sensor, a breathing-rate sensor, a camera, a GPS receiver capable of determining a location of the user device, smart handcuffs, a clock, calendar, environmental sensors (e.g. a thermometer capable of determining an ambient temperature, humidity, presence of dispersed chemicals, radiation detector, etc.), an accelerometer, a biometric sensor (e.g., wristband), a barometer, speech recognition circuitry, a gunshot detector, . . . , etc. Some examples follow:

A sensor-enabled holster 412 may be provided that maintains and/or provides state information regarding a weapon or other item normally disposed within the user's sensor-enabled holster 412. The sensor-enabled holster 412 may detect a change in state (presence to absence) and/or an action (removal) relative to the weapon normally disposed within the sensor-enabled holster 412. The detected change in state and/or action may be reported to the portable radio 101 via its short-range transceiver. In some embodiments, the sensor-enabled holster may also detect whether the first responder's hand is resting on the weapon even if it has not yet been removed from the holster and provide such information to portable radio 101. Other possibilities exist as well.

A biometric sensor 412 (e.g., a biometric wristband) may be provided for tracking an activity of the user or a health status of the user 301, and may include one or more movement sensors (such as an accelerometer, magnetometer, and/or gyroscope) that may periodically or intermittently provide to the portable radio 101 indications of orientation, direction, steps, acceleration, and/or speed, and indications of health such as one or more of a captured heart rate, a captured breathing rate, and a captured body temperature of the user 301, perhaps accompanying other information.

An accelerometer 412 may be provided to measures acceleration. Single and multi-axis models are available to detect magnitude and direction of the acceleration as a vector quantity, and may be used to sense orientation, acceleration, vibration shock, and falling. The accelerometer 412 may determine if an officer is running. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

A heart rate sensor 412 may be provided and use electrical contacts with the skin to monitor an electrocardiography (EKG) signal of its wearer, or may use infrared light and imaging device to optically detect a pulse rate of its wearer, among other possibilities.

A breathing rate sensor 412 may be provided to monitor breathing rate. The breathing rate sensor may include use of a differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well.

A body temperature sensor 412 may be provided, and includes an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities. Temperature sensor 412 may be used on equipment to determine if the equipment is being worn or not. For example, temperature sensor 412 may exist interior to a bullet-proof vest. I the temperature sensor 412 senses a temperature above a predetermined threshold (e.g., 80 degrees), it may be assumed that the vest is being worn by an officer.

Computer 414 comprises, or is part of, a computer-aided-dispatch center (sometimes referred to as an emergency-call center), that may be manned by an operator providing necessary dispatch operations. For example, computer 414 typically comprises a graphical user interface that provides the dispatch operator necessary information about public-safety officers. As discussed above, much of this information originates from devices 412 providing information to hub 101, which forwards the information to RAN 402 and ultimately to computer 414.

Each user of the system may possess a hub with many associated devices forming a PAN. For each user of the system, computer 414 may track the user's current associated PAN devices (sensors 412) along with sensor data for that user. This information may be used to compile a summary for each user (e.g., equipment on hand for each user, along with state information for the equipment). The information is preferably stored in database 264.

As officers are assigned to specific incidents, a computer-aided dispatch (CAD) incident identifier can be generated by computer 414 and sent to hub 101 when the officer using hub 101 is assigned a particular task. An incident identification (sometimes referred to as an incident scene identifier, CAD identification, or a CAD incident identifier (CAD ID)) is generated for incidents where an officer is dispatched/assigned, or where an officer encounters a public-safety event. This ID could be something as simple as a number associated with a particular incident type, or something as complicated as an identification that is a function of populated fields (e.g., time, location, incident type, . . . , etc.), one of which may comprise an incident type.

Figure 5:
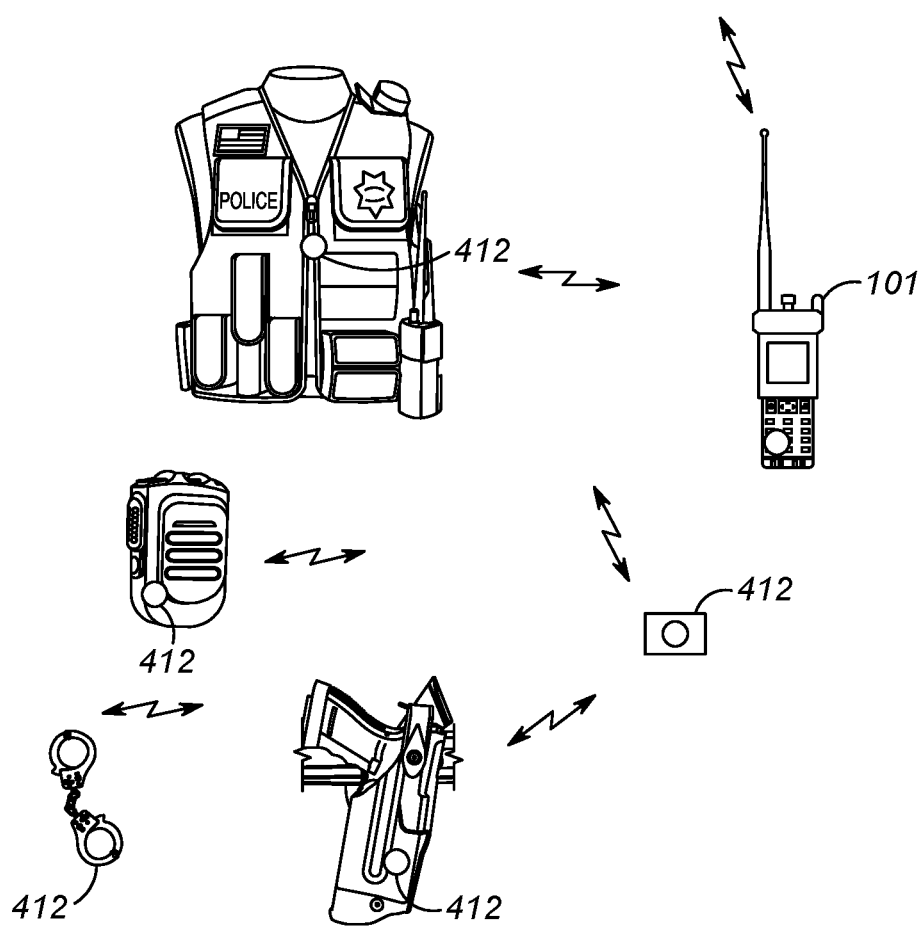
FIG. 5 is a more-detailed view of a personal-area network of FIG. 4.

FIG. 5 depicts another view of a personal-area network 440 of FIG. 4. Personal-area network comprises a very local-area network that has a range of, for example 10 feet.

As shown in FIG. 5, various devices 412 are that attach to clothing utilized by a public-safety officer. In this particular example, a bio-sensor is located within a police vest, a voice detector is located within a police microphone, smart handcuffs 412 are usually located within a handcuff pouch (not shown), a gun-draw sensor is located within a holster, and a camera 412 is provided.

Devices 412 and hub 101 form a PAN 440. PAN 440 preferably comprises a Bluetooth PAN. Devices 412 and hub 101 are considered Bluetooth devices in that they operate using a Bluetooth, a short range wireless communications technology at the 2.4 GHz band, commercially available from the "Bluetooth special interest group". Devices 412 and hub 101 are connected via Bluetooth technology in an ad hoc fashion forming a PAN. Hub 101 serves as a master device while devices 412 serve as slave devices.

Hub 101 receives information from various sensors 412 and provides the information to the officer, and/or forwards local status alert messages describing each sensor state/trigger event over a wide-area network (e.g., RAN/Core Network) to computer 414. Hub 101 also receives CAD IDs sent to it from dispatch center 414. The CAD IDs may be sent to hub 101 utilizing networks 404 and 402. Hub 101 is configured to use the CAD ID in formulating messages as described herein. Additionally, hub 101 may also be configured to use the information received from various sensors 412 in formulating messages.

In alternate embodiments of the present invention, hub 101 may forward the local status alerts/updates for each sensor to mobile and non-mobile peers (shift supervisor, peers in the field, etc), or to the public via social media. RAN core network preferably comprises a network that utilizes a public-safety over-the-air protocol. Thus, hub 101 receives sensor information via a first network (e.g., Bluetooth PAN network), and forwards the information to computer 414 via a second network (e.g., a public safety wide area network (WAN)).

As described above, hub 101, serving as a message generator may provide an officer messages based on a received CAD ID (received over a Wide-Area Network (WAN)). In addition, the messages may also be based on sensor data received from sensors 412 over a Personal-Area Network (PAN). So, for example, an officer assigned a first CAD ID by computer 414 will have a first option of messages displayed for the officer when utilizing a text/instant message application, and an officer assigned a second CAD ID by computer 414, will have a second option of messages displayed for the officer when utilizing a text/instant message application. The messages displayed/presented may further be based on a sensor status.

As an example, assume a dispatch operator receives an emergency call (e.g., 911 call) reporting a burglary in progress. The operator instructs computer to assign this incident to Officer Fred. Officer Fred is assigned a CAD ID corresponding to a burglary in progress. Hub 101 receives the CAD ID. Because of this, Officer Fred's messaging application on hub 101 will display messages that relate to a burglary in progress. So, for example, one messages may include the text, "I am responding to a burglary". Additional choices of messages may take into consideration sensor data. So, for example, if a location sensor 412 determines that officer Fred is running, a message may also be presented as, "I am currently in a foot chase". If a location sensor 412 determines that officer Fred is at 412 Mane Street, a message may also be presented as, "I am currently at 412 Mane Street". If a gun-draw sensor 412 determines that officer Fred has drawn his weapon, a message may also be presented as, "I have my weapon drawn". Once a message(s) is selected, the message will be populated into a text field of a messaging/texting application. This is illustrated in FIG. 6 and FIG. 7.

Figure 6:
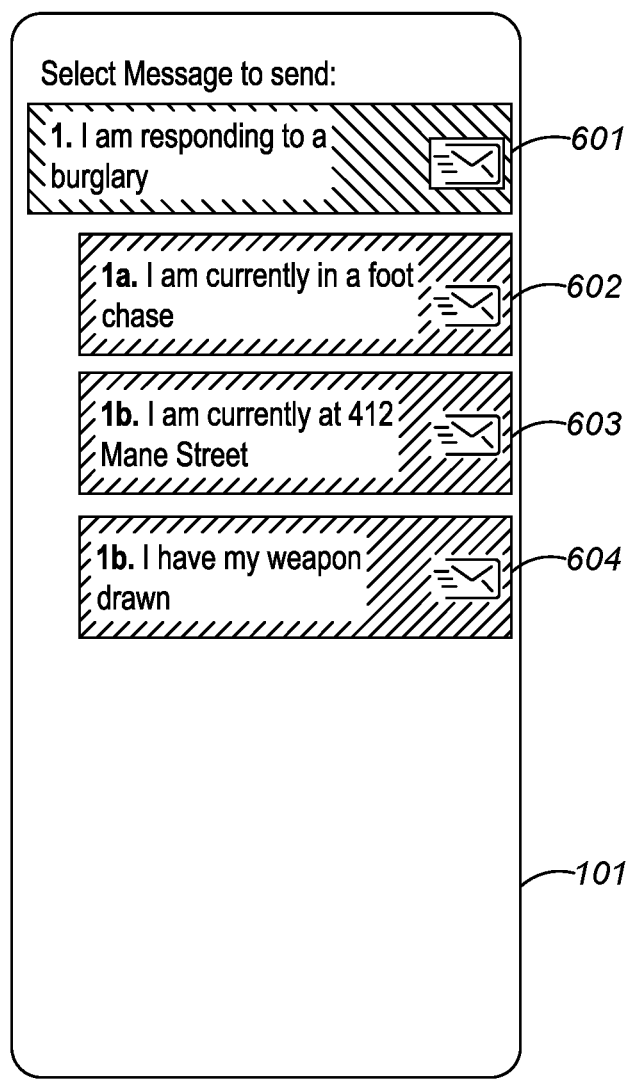
FIG. 6 illustrates auto-generation of message prefixes.
Figure 7:
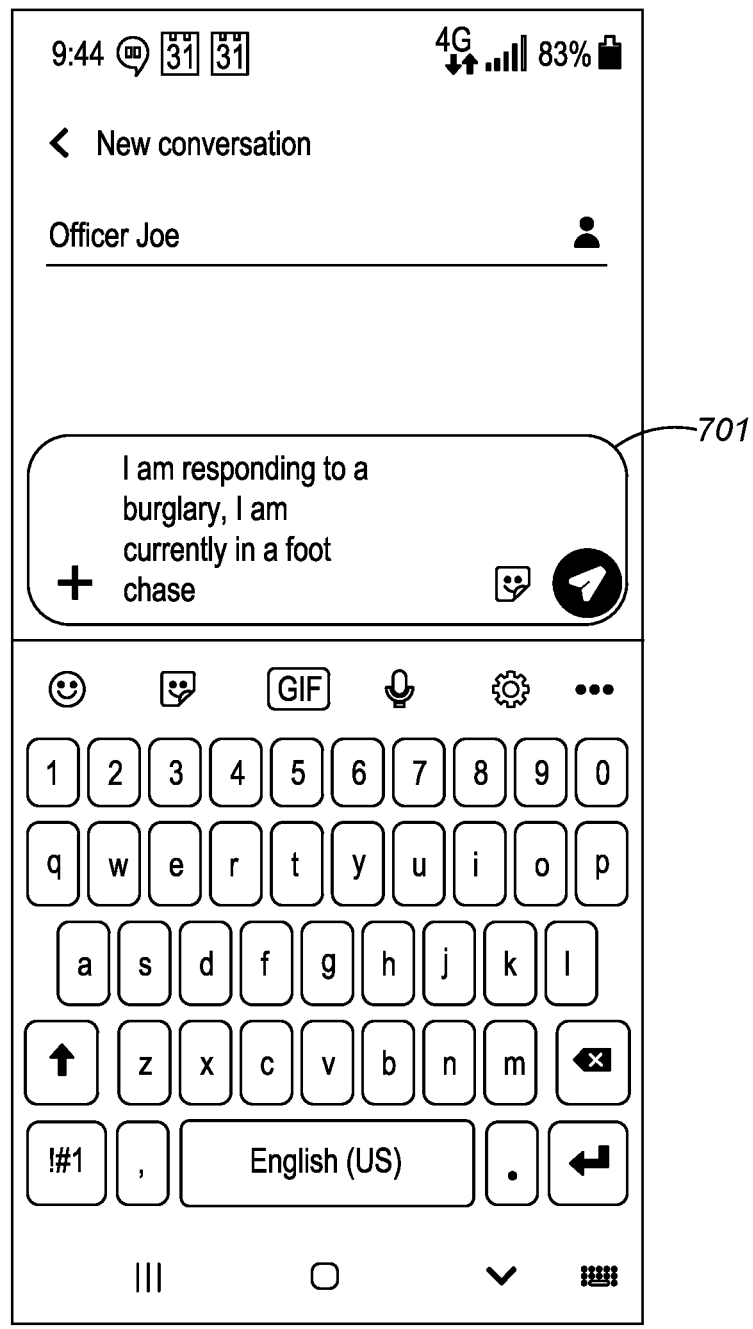
FIG. 7 illustrates a text message with auto-generated text.

As is evident in FIG. 6, message 601 is based on the CAD ID, while messages 602-604 are based on sensor data. As the officer "selects" various messages, a text message, or an instant message is generated including the selected messages. This is shown in FIG. 7 as message 701 to be sent to Officer Joe. More particularly, message 701 is generated from messages 601 and 602, and may be edited prior to sending.

Figure 8:
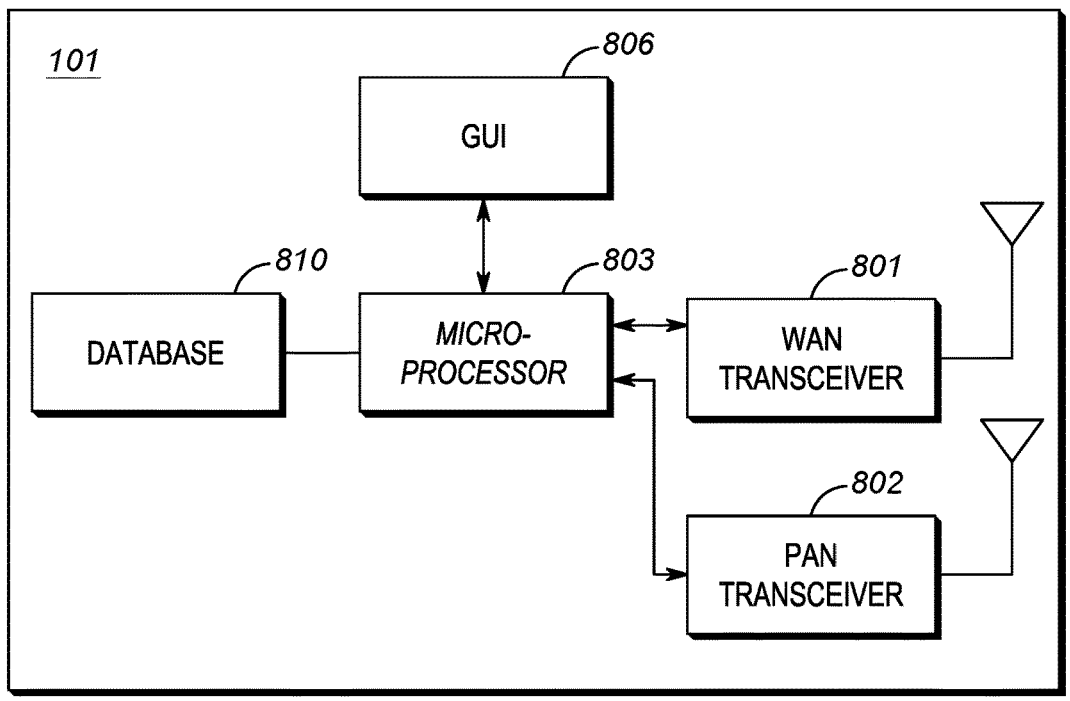
FIG. 8 is a block diagram of a hub.

FIG. 8 sets forth a schematic diagram that illustrates a device 101 that determines a public-safety event (e.g., a status of devices/equipment and/or an incident assigned to an officer), and generates messages accordingly. In an embodiment, the message-generating functionality is embodied within device 101, however in alternate embodiments the functionality may be embodied within the public-safety core network 404, or more computing devices in a cloud compute cluster (not shown), or some other communication device not illustrated in FIG. 4, and/or may be a distributed communication device across two or more entities.

FIG. 8 shows those components (not all necessary) for device 101 to determine what equipment is present, determine a status of the equipment present, determine an incident assigned to an officer, and to generate messages based on both the status of the equipment present and the current incident assigned to an officer. As shown, device 101 includes a wide-area-network (WAN) transceiver 801 (e.g., a transceiver that utilizes a public-safety communication-system protocol), PAN transceiver 802 (e.g., a short-range transceiver), Graphical User Interface (GUI) 806, database 810, and logic circuitry 803.

WAN transceiver 801 may comprise well known long-range transceivers that utilize any number of network system protocols. (As one of ordinary skill in the art will recognize, a transceiver comprises both a transmitter and a receiver for transmitting and receiving data). For example, WAN transceiver 801 may be configured to utilize a next-generation cellular communications protocol operated by a cellular service provider, or any public-safety protocol such as an APCO 25 network or the FirstNet broadband network. WAN transceiver 801 provides sensor status updates to dispatch center 414. WAN transceiver 801 also receives CAD IDs from dispatch center 414.

PAN transceiver 802 may be well known short-range (e.g., 30 feet of range) transceivers that utilize any number of network system protocols. For example, PAN transceiver 802 may be configured to utilize Bluetooth communication system protocol for a body-area network, or a private 802.11 network. PAN transceiver forms the PAN (acting as a master device) with various sensors 412. PAN transceiver receives status updates from sensors 412.

GUI 806 provides a man/machine interface for receiving an input from a user and displaying information. For example, GUI 806 may provide a way of conveying (e.g., displaying) information received from processor 803. Part of this information may comprise stored responses as described above. Additionally, GUI 806 is configured to receive an input from a user and modify any message as described above. In order to provide the above features (and additional features), GUI 806 may comprise any combination of a touch screen, a computer screen, a keyboard, or any other interface needed to receive a user input and provide information to the user.

Logic circuitry 803 comprises a digital signal processor (DSP), general purpose microprocessor, a programmable logic device, or application specific integrated circuit (ASIC) and is configured to provide message-generating functionality as described herein. More particularly, logic circuitry 803 is configured as a message generator by running at least one messaging application stored in database 810. The messaging application stored in database 810 comprising instructions to logic circuitry 803 to generate messages and send messages as described herein.

Database 810 is provided. Database 810 comprises standard memory (such as RAM, ROM, . . . , etc.) and serves to store potential messages, along with triggers when to use the potential messages. So, for example, database 810 may comprise a table of responses (messages) along with the CAD IDs and sensor statuses that will trigger the stored messages being offered to the user.

FIG. 8 shows those components that will allow hub 101 to map a sensor state and/or a CAD ID to messages that will be presented to a user. The mapping process preferably comprises an operation that associates each element of a given set (the domain) with one or more elements of a second set (the range). The PAN sensor statuses and/or the CAD IDs for a user comprises the domain, while the presented messages comprise the range.

The mapping may be explicit based on predefined rules, or the mapping may be trained via neural network modeling. The mapping is done by determining PAN member status and/or CAD ID for a user, and mapping this information to a plurality of messages. For example, assume Officer Smith is assigned to a burglary, and has a weapon drawn. This combination (domain) may be mapped to messages to display to Officer Smith.

With the above in mind, FIG. 8 provides for an apparatus comprising a wide-area network transceiver configured to receive information regarding an incident type assigned to a public-safety officer, logic circuitry configured to map the incident type to potential messages, and a graphical-user interface (GUI) configured to display the potential messages, and receive a user action selecting at least one of the displayed messages to be inserted as text into a message field of a messaging/texting application.

As discussed above, the logic circuitry is also configured to insert the selected messages into the message field of the messaging/texting application.

A personal-area-network (PAN) transceiver may be provided and configured to receive a sensor data from a plurality of sensors that form a PAN, and where the logic circuitry maps both the incident type and the sensor data to the potential messages.

The sensor data may comprise information that a gun has been drawn.

As is evident, the potential messages are based on the incident type such that a first incident type will map to a first set of potential messages, and second incident type will map to second set of potential messages.

When both the incident type and sensor data are being taken into consideration for potential messages, the potential messages are based on the incident type and the sensor data such that a first incident type and sensor data will map to a first set of potential messages, and second incident type and sensor data will map to second set of potential messages.

Figure 9:
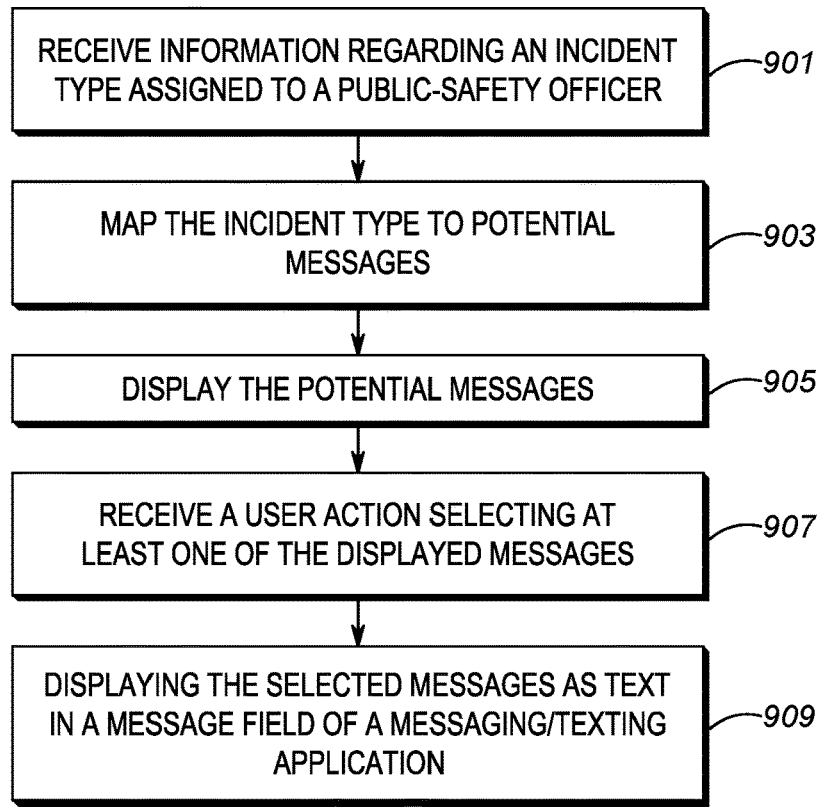
FIG. 9 is a flow chart showing operation of the hub of FIG. 8.

FIG. 9 is a flow chart showing the operation of the hub of FIG. 8. The logic flow begins at step 901 where WAN transceiver 801 receives information regarding an incident type assigned to a public-safety officer and forwards the incident type to logic circuitry 803. As discussed above, the incident type may comprise a CAD ID. At step 903, logic circuitry 803 maps the incident type to potential messages and sends the potential messages to GUI 806 to be displayed. At step 905 GUI 806 displays the potential messages.

A user action is received at step 907 selecting at least one of the displayed messages. The user action may be any action where the user may select at least one of the displayed messages. Such actions comprise, tapping on the selected messages, using a keyboard to highlight and select the displayed messages, or any other technique.

Finally, at step 909, logic circuitry causes the selected message to be displayed as text in a message field of a messaging/texting application. A user may modify the selected message, select recipients, and send the modified selected message to the recipients.

As discussed above, sensor data may also be received by PAN transceiver 802 and forwarded to logic circuitry 803. The sensor data comprises a sensor state sent from a plurality of sensors that form a PAN, such as a sensor state that a gun has been drawn. The step of mapping may also comprise mapping both the incident type and the sensor data to the potential messages.

As discussed above, the potential messages are based on the incident type and/or the sensor state such that a first incident type and/or sensor state will map to a first set of potential messages, and second incident type and/or sensor state will map to second set of potential messages.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less all features of a single disclosed embodiment. Thus the following claims are hereby incorporated into the Detailed Description, with each claim standing on its own as a separately claimed subject matter.

What is claimed is:

1. An apparatus comprising:
    a wide-area network transceiver configured to receive information regarding an incident type assigned to a public-safety officer;
    logic circuitry configured to map the incident type to potential messages; and
    a graphical-user interface (GUI) configured to display the potential messages, and receive a user action selecting at least one of the displayed messages to be inserted as text into a message field of a messaging/texting application.

2. The apparatus of claim 1, wherein the logic circuitry is also configured to insert the selected messages into the message field of the messaging/texting application.

3. The apparatus of claim 1 further comprising:
    a personal-area-network (PAN) transceiver configured to receive a sensor data from a plurality of sensors that form a PAN; and
    wherein the logic circuitry maps both the incident type and the sensor data to the potential messages.

4. The apparatus of claim 3 wherein the sensor data comprises information that a gun has been drawn.

5. The apparatus of claim 1 wherein the potential messages are based on the incident type such that a first incident type will map to a first set of potential messages, and second incident type will map to second set of potential messages.

6. An apparatus comprising:
    a wide-area network transceiver configured to receive information regarding an incident type assigned to a public-safety officer;
    a personal-area-network (PAN) transceiver configured to receive a sensor data from a plurality of sensors that form a PAN;
    logic circuitry configured to map the incident type and the sensor data to potential messages;
    a graphical-user interface (GUI) configured to display the potential messages, and receive a user action selecting at least one of the displayed messages to be inserted as text into a message field of a messaging/texting application; and
    wherein the logic circuitry is also configured to insert the selected messages into the message field of the messaging/texting application.

7. The apparatus of claim 6 wherein the potential messages are based on the incident type and the sensor data such that a first incident type and sensor data will map to a first set of potential messages, and second incident type and sensor data will map to second set of potential messages.

8. A method comprising the steps of:
    receiving information regarding an incident type assigned to a public-safety officer;
    mapping the incident type to potential messages;
    displaying the potential messages
    receiving a user action selecting at least one of the displayed messages; and
    inserting the selected message as text into a message field of a messaging/texting application.

9. The method of claim 8 further comprising the step of:
    receiving a sensor data from a plurality of sensors that form a PAN; and
    the step of mapping comprises mapping both the incident type and the sensor data to the potential messages.

10. The method of claim 9 wherein the sensor data comprises information that a gun has been drawn.

11. The method of claim 8 wherein the potential messages are based on the incident type such that a first incident type will map to a first set of potential messages, and second incident type will map to second set of potential messages.

* * * * *